US010310596B2

(12) United States Patent
Baughman et al.

(10) Patent No.: US 10,310,596 B2
(45) Date of Patent: *Jun. 4, 2019

(54) AUGMENTED REALITY TO FACILITATE ACCESSIBILITY (71) Applicant: International Business Machines Corporation, Armonk, NY (US)

(72) Inventors: Aaron K. Baughman, Silver Spring, MD (US); Diwesh Pandey, Bangalore (IN); John P. Perrino, Hedgesville, WV (US); Todd R. Whitman, Bethany, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,098

(22) Filed: Dec. 18, 2017

(65) Prior Publication Data
US 2018/0341322 A1 Nov. 29, 2018

Related U.S. Application Data (63) Continuation of application No. 15/605,064, filed on May 25, 2017.

(51) Int. Cl.
G06F 3/01 (2006.01)
H04W 76/10 (2018.01)
(Continued)

(52) U.S. Cl.
CPC .............. G06F 3/011 (2013.01); G05B 15/02 (2013.01); G06F 3/1423 (2013.01); G06T 11/60 (2013.01);
(Continued)

(58) Field of Classification Search
CPC ...... G06F 3/011; G06F 3/1423; H04W 76/10; G06T 11/60; H05B 37/0245; G09G 5/02;
(Continued)

(56) References Cited

U.S. PATENT DOCUMENTS 9,164,577 B2 10/2015 Tapley et al.
9,292,085 B2 3/2016 Bennett et al.
(Continued)

FOREIGN PATENT DOCUMENTS

CN 103456145 A 12/2013
CN 104019522 A 9/2014
(Continued)

OTHER PUBLICATIONS

WIPO Int'l. Appln. PCT/IB2018/052889, International Search Report and Written Opinion, dated Aug. 22, 2018, 10 pg.

Primary Examiner — Premal R Patel
(74) Attorney, Agent, or Firm — Cuenot, Forsythe & Kim, LLC (57) ABSTRACT A determination can be made as to whether a user of an augmented reality device is within a threshold distance from a configurable physical apparatus. Responsive to determining that the user is within the threshold distance from the configurable physical apparatus, a communication link can be established between the augmented reality device and a controller of the configurable physical apparatus. The augmented reality device can initiate the controller of the configurable physical apparatus to change the configurable physical apparatus from a first configuration to a second configuration, wherein the second configuration facilitates accessibility of the configurable physical apparatus to the user.

9 Claims, 7 Drawing Sheets (51) Int. Cl.
*G05B 15/02* (2006.01)
*G06F 3/14* (2006.01)
*G06T 11/60* (2006.01)
*G09G 5/02* (2006.01)
*H05B 37/02* (2006.01)

(52) U.S. Cl.
CPC .............. *G09G 5/02* (2013.01); *H04W 76/10* (2018.02); *H05B 37/0245* (2013.01); *G09G 2354/00* (2013.01); *G09G 2370/06* (2013.01); *G09G 2370/16* (2013.01)

(58) Field of Classification Search
CPC ........... G09G 2370/06; G09G 2370/16; G09G 2354/00; G05B 15/02
See application file for complete search history.

(56) References Cited

U.S. PATENT DOCUMENTS

| | | | |
|---|---|---|---|
| 2006/0061586 A1* | 3/2006 | Brulle-Drews | A61B 3/066 345/594 |
| 2010/0033296 A1 | 2/2010 | Dong et al. | |
| 2012/0074842 A1* | 3/2012 | Hattori | B60Q 1/1423 315/77 |
| 2012/0194554 A1 | 8/2012 | Kaino et al. | |
| 2014/0104316 A1 | 4/2014 | Sharma et al. | |
| 2014/0163867 A1 | 6/2014 | Fernandez | |
| 2014/0282220 A1 | 9/2014 | Wantland et al. | |
| 2014/0347394 A1 | 11/2014 | Padilla | |
| 2015/0087484 A1* | 3/2015 | Bayerlein | A63B 22/0235 482/54 |
| 2015/0123966 A1 | 5/2015 | Newman | |
| 2015/0187108 A1 | 7/2015 | Mullins | |
| 2015/0253886 A1 | 9/2015 | Wei et al. | |
| 2015/0254603 A1* | 9/2015 | Bashkin | G06Q 10/087 312/237 |
| 2015/0316985 A1 | 11/2015 | Levesque et al. | |
| 2016/0370855 A1* | 12/2016 | Lanier | H04N 5/335 |
| 2017/0011210 A1* | 1/2017 | Cheong | H04W 12/06 |
| 2017/0318612 A1* | 11/2017 | Gu | H04W 4/80 |

FOREIGN PATENT DOCUMENTS

| | | |
|---|---|---|
| CN | 106534541 A | 3/2017 |
| GB | 2494697 A | 3/2013 |

\* cited by examiner

Determine whether a user of an augmented reality device is within a threshold distance from a configurable physical apparatus
905

---

Responsive to determining that the user is within the threshold distance from the configurable physical apparatus, establish a communication link between the augmented reality device and a controller of the configurable physical apparatus
910

---

Initiate, by the augmented reality device, the controller of the configurable physical apparatus to change the configurable physical apparatus from a first configuration to a second configuration, wherein the second configuration facilitates accessibility of the configurable physical apparatus to the user
915

FIG. 9

AUGMENTED REALITY TO FACILITATE ACCESSIBILITY

BACKGROUND

The present invention relates to augmented reality and, more particularly, to augmented reality devices.

Augmented reality, in its conventional sense, is a live direct or indirect view of a physical, real-world environment whose elements are augmented (or supplemented) by computer-generated sensory input such as sound, video, graphics or global positioning system (GPS) data. Augmented reality conventionally is performed in real time and in context with environmental elements. In contrast to virtual reality in which a virtual world is presented, augmented reality presents and augments information about the surrounding real world.

SUMMARY

A method includes determining whether a user of an augmented reality device is within a threshold distance from a configurable physical apparatus. The method also can include, responsive to determining that the user is within the threshold distance from the configurable physical apparatus, establishing a communication link between the augmented reality device and a controller of the configurable physical apparatus. The method also can include initiating, by the augmented reality device, the controller of the configurable physical apparatus to change the configurable physical apparatus from a first configuration to a second configuration, wherein the second configuration facilitates accessibility of the configurable physical apparatus to the user.

DETAILED DESCRIPTION

This disclosure relates to augmented reality and, more particularly, to augmented reality devices. In accordance with the inventive arrangements disclosed herein, an augmented reality device can initiate a physical apparatus to change configuration in order to facilitate accessibility of the physical apparatus to a user. For example, the augmented reality device can initiate the physical apparatus to move a hand rail or a shelf to a height preferred by a user. In another example, the augmented reality device can initiate the physical apparatus to change a color of a sign or a lamp to a color recognizable by the user, for instance if the user has a visual impairment such as color blindness. In yet another example, the augmented reality device can initiate the physical apparatus to control a plurality of lamps to illuminate a path for the user to travel from one location to another. One or more colors of light illuminated by the lamps can be selected to be colors recognizable by the user.

Several definitions that apply throughout this document now will be presented.

As defined herein, the term "augmented reality device" means a device carried with a user, either on a person of the user or on a mobile device/apparatus that travels with the user, including at least one processor and memory that augments real world elements as presented to the user. Examples of an augmented reality device include, but are not limited to, augmented reality glasses (e.g., smart glasses), augmented reality headsets and mobile devices (e.g., smart phone) including an augmented reality application. Sensors, such as motion detectors and touch sensors, which are not carried with a user during operation, are not augmented reality devices as the term "augmented reality device" is defined herein.

As defined herein, the term "configurable physical apparatus" means a physical apparatus operable among a plurality of configurations of the physical apparatus.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "transceiver" means a device configured to modulate and demodulate signals to convert signals from one form to another, and transmit and/or receive such signals over one or more various wireless communication networks. In illustration, a transceiver can communicate data via 2G, 3G, 4G, GSM, LTE, UMB, GPRS, EUTRAN, TDMA, CDMA, WCDMA, UMTS, OFDM, HSPA+, direct wireless communication, etc. Direct wireless communications include, but are not limited to, personal are network (PAN) communications. Examples of PAN communications include, but are not limited to, Bluetooth®, Bluetooth® low energy (BLE) and/or Zigbee™ communication protocols, and so on. Further, a transceiver may be embodied as a wireless network adapter configured to communicate data via IEEE 802 wireless communications, for example, 802.11 and 802.16 (WiMax), mobile WiMax, WPA, or WPA2. Still, the invention is not limited to these examples and a transceiver can be configured to communicate RF signals in accordance with any suitable communications standards, protocols, and/or architectures, or a suitable combination of such standards, protocols, and/or architectures.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 1:
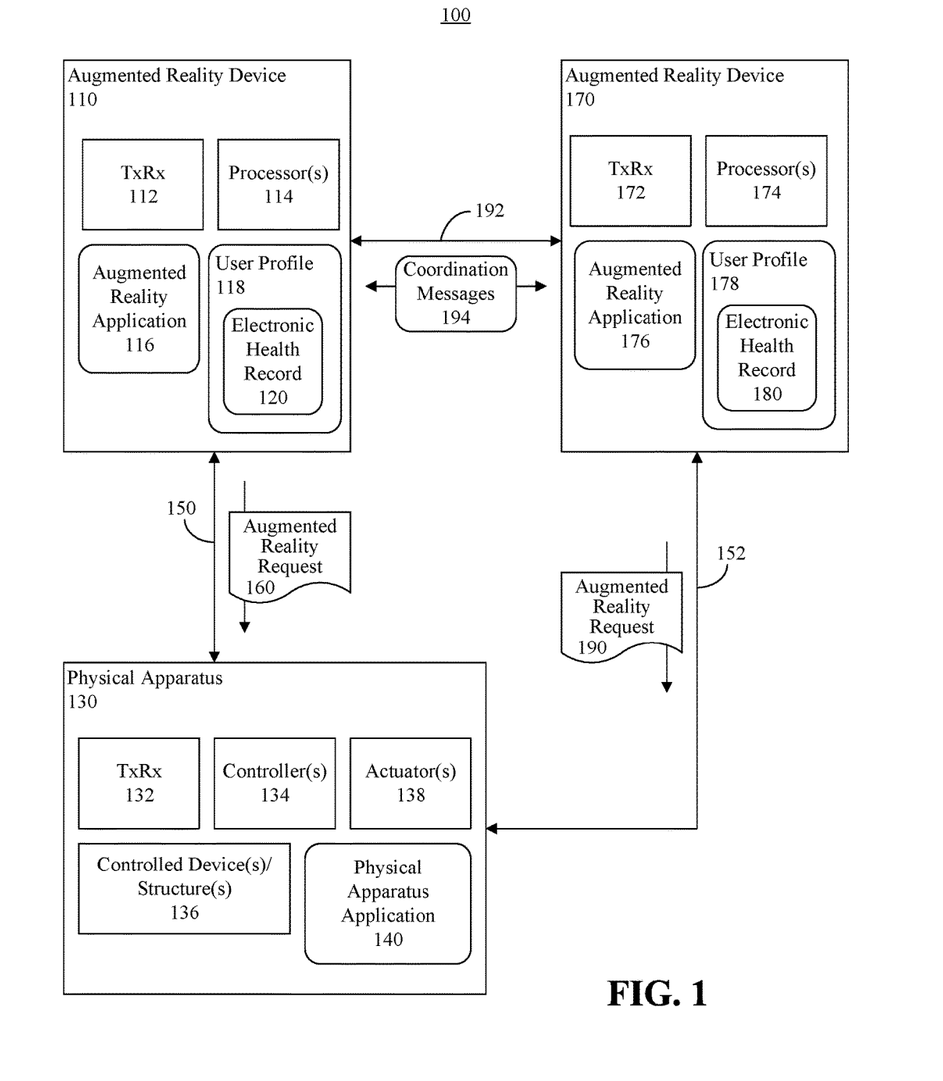
FIG. 1 is a block diagram illustrating an example of an augmented reality environment.

FIG. 1 is a block diagram illustrating an example of an augmented reality environment 100. The augmented reality environment 100 can include an augmented reality device 110 and a physical apparatus 130. The augmented reality device 110 can include at least one transceiver 112, at least one processor 114, an augmented reality application 116 and, optionally, a user profile 118.

The augmented reality application 116 can be configured to detect proximity of the augmented reality device 110 to the physical apparatus 130 based on signals generated by the physical apparatus 130 and received by the transceiver 112. Further, the augmented reality application 116 can be configured to initiate various processes, which will be described herein, based, at least in part, on the proximity of the augmented reality device 110 to the physical apparatus 130.

The user profile 118 can store user profile data for a user of the augmented reality application 116. In one arrangement, the user profile 118 can store an electronic health record 120 of the user. In another arrangement, the augmented reality application 116 can access the electronic health record 120 of the user from another system (not shown), for example via the transceiver 112.

The physical apparatus 130 can include at least one transceiver 132, one or more controllers 134, one or more controlled devices and/or structures 136 and, optionally, one or more actuators 138. Further, the physical apparatus 130 can include a physical apparatus application 140. The physical apparatus application 140 can be stored in memory (not shown) accessed by the controller(s) 134, stored as computer program code within the controller(s) 134, or implemented as configuration data used to configure the controller 134 (e.g., in an arrangement in which the controller 134 comprises programmable log circuitry, an FPGA, a PLA, etc.).

The controller(s) 134 can be processors, or any other hardware circuits (e.g., integrated circuits) configured to carry out instructions contained in program code of the controller(s) 134 and/or configured to carry out instructions provided by the physical apparatus application 140. In this regard, the controller(s) 134 can be processors specifically configured to carry out certain instructions, though the present arrangements are not limited in this regard.

The controlled devices and/or structures 136 can be components of the physical apparatus 130 configured to be operable among a plurality of operation states, for example in response to control signals received from one or more of the controller(s) 134 or in response to mechanical inputs received by one or more actuators 138 controlled by the controller(s) 134. In illustration, the actuators 138 can include one or more magnets, motors, etc. that are configured to mechanically move one or more components of the controlled devices and/or structures 136.

In another arrangement, the controller(s) 134 can directly operate the controlled devices and/or structures 136 among various a plurality of operation states. For example, the controller(s) 134 can directly interface with the controlled devices and/or structures 136 to control the operational states of the controlled devices and/or structures 136. In illustration, the controller(s) 134 can directly interface with signs and/or lamps to control a color of light emitted by the signs and/or lamps, control a direction in which the signs and/or lamps emit light, and so on. The controller(s) 134 can generate control signals in response to data received from the physical apparatus application 140, or the controller(s) 134 can generate control signals in response to data received from the augmented reality application 116.

The augmented reality device 110 can be communicatively linked to one or more physical apparatus's, for example the physical apparatus 130, via at least one communication link 150 established between the transceiver 112 and the transceiver 132. The communication link 150 is the medium used to provide communications between the augmented reality device 110 and the physical apparatus 130, and can be established in accordance with any of the previously described protocols. Via the communication link 150, the augmented reality application 116 can communicate to the physical apparatus application 140, or directly to the controller(s) 134, augmented reality requests 160. The augmented reality requests 160 can indicate to the physical apparatus application 140, or directly to the controller(s) 134, data indicating a desired configuration state of the physical apparatus 130 optimized for a user of the augmented reality device 110.

In one non-limiting arrangement, the augmented reality environment 100 further can include one or more additional augmented reality devices, for example an augmented reality device 170. The augmented reality device 170 can include at least one transceiver 172, at least one processor 174, an augmented reality application 176 and, optionally, a user profile 178. The transceiver 172, processor 174, augmented reality application 176 and user profile 178 can be configured in respective manners similar to those described for the transceiver 112, processor 114, augmented reality application 116 and user profile 118. Further, the augmented reality device 170 can be communicatively linked to one or more physical apparatus's, for example the physical apparatus 130, via at least one communication link 152 established between the transceiver 172 and the transceiver 132. Optionally, the user profile 178 can store an electronic health record 180 of the user of the augmented reality device 170. In another arrangement, the augmented reality application 176 can access the electronic health record 180 of that user from another system (not shown), for example via the transceiver 172.

Figure 2:
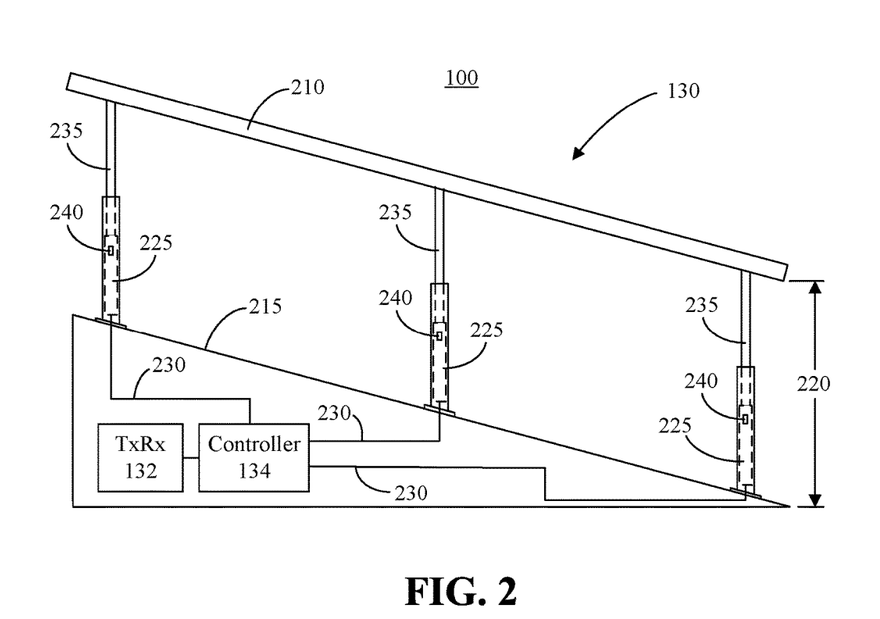
FIG. 2 depicts an example of a moveable hand rail in an augmented reality environment.

FIG. 2 depicts an example of a moveable hand rail 210 in an augmented reality environment 100. In this example, the physical apparatus 130 can include the hand rail 210 as the controlled structure 136 (FIG. 1). The hand rail 210 can be positioned proximate to a ramp 215 or steps the user wishes to traverse, though the present arrangements are not limited in this regard. For example, the hand rail 210 can be positioned proximate to another type of walkway. As will be described, the height of the hand rail 210 can be adjustable. Moreover, the height can be adjusted to a height that is preferred by the user of the augmented reality device 110 (FIG. 1). This can facilitate accessibility of the hand rail 210 to the user, making it easier for the user to grasp the hand rail 210 and use the hand rail 210 for support while walking.

Referring to FIGS. 1 and 2, the augmented reality device 110 can determine whether the user is within a threshold distance of the hand rail 210. For example, via the transceiver 132, the controller 134 can transmit a beacon signal. The beacon signal can be transmitted, for example, in accordance with a short range RF transmission protocol, for example BLE. Using the transceiver 112 and processor 114, the augmented reality application 116 can monitor for the beacon signal. Responsive to detecting the beacon signal, the augmented reality application 116 can determine that the user is within the threshold distance of the hand rail 210. In this regard, the threshold distance can be a distance over which the beacon signal is detectable by the augmented reality device 110.

In another arrangement, the user can enter a user input into the augmented reality device 110 to indicate the user is within a threshold distance of the hand rail 210. For example, the user can enter the user input as the user approaches the hand rail 210. In this example, the threshold distance can be a distance between the user (e.g., the augmented reality device 110 used by the user) and the hand rail 210 at the time when the user enters the user input.

Responsive to detecting the beacon signal or the user input, using the transceiver 112 and processor 114, the augmented reality application 116 can communicate the augmented reality request 160 to the physical apparatus 130. The augmented reality request 160 can indicate a preferred height 220 of the hand rail 210 for the user, for example a height 220 above the ramp 215, steps or a floor. The augmented reality application 116 can determine the preferred height 220 based on the user profile 118 or the electronic health record 120, and generate the augmented reality request 160 to include the preferred height 220. The height 220 can be measured/defined from a top surface of the ramp 215, stairs or walkway to the hand rail 210, or measured/defined from in any other suitable manner.

Using the transceiver 112 and processor 114, the augmented reality application 116 can communicate the augmented reality request 160 to the physical apparatus 130, for example to the transceiver 112, using at least one RF communication protocol, such as an RF communication protocol known in the art (e.g., BLE). The transceiver 132 can receive the augmented reality request 160 and communicate the augmented reality request 160 to the controller 134. The controller 134 can process the augmented reality request 160 to determine the preferred height 220 of the hand rail 210 for the user. In this regard, the augmented reality request 160 can initiate adjustment of the height 220 of the hand rail 210 for the user.

The controller 134 can output control signals 230 to one or more actuators 225. The control signals 230 can control the actuators 225 to move the hand rail 210, for example vertically up and down, to the desired height 220. In one arrangement, the actuators 225 can be telescoping actuators that move structural support members 235 up and down in the vertical direction. Still, other types of actuators can be used and the present arrangements are not limited in this regard. For instance, if the hand rail 210 is attached to a wall, the actuators 225 can be slide actuators. The actuators 225 can operate using hydraulic, pneumatic, electric, magnetic and/or mechanical processes, as is known in the art.

In one arrangement, the actuators 225 can include sensors 240 that generate sensor data indicating the present height of the hand rail 210. In another arrangement, the sensors 240 can be located external to the actuators 224 in suitable locations. In one aspect, the actuators 225 can process the sensor data to determine the height of the hand rail 210 at any time, for example prior to, when, and after the hand rail 210 is moved, and stop movement of the hand rail 210 responsive to the hand rail 210 being moved from a previous height to the desired height 220. In another aspect, the sensors 240 can communicate the sensor data to the controller 134, and the controller 134 can generate the control signals 230 in response to the sensor data. In this regard, the controller 134 can control the actuators 225 to stop movement of the hand rail 210 responsive to the hand rail 210 being moved to the desired height 220.

In some instances, augmented reality devices 110, 170 of a plurality of users may generate augmented reality requests 160, 190 at, or near, the same time. In one arrangement, the controller 134 can implement scheduling processes to determine which augmented reality request 160, 190 to first process. For example, the controller 134 can process the first received augmented reality request 160, and temporarily store to memory the second augmented reality request 190. Responsive to adjusting the height of the hand rail 210 in accordance with the first augmented reality request 160, the controller 134 can maintain the hand rail 210 at that height 220 for a threshold period of time. The threshold period of time can be a period of time long enough for the first user to traverse the ramp 215, stairs or walkway. In a further aspect, the physical apparatus 130 can include one or more sensors (not shown) that detect when the user has traversed the ramp 215, stairs or walkway, and maintain the hand rail 210 at the height 220 until the user has traversed the ramp 215, stairs or walkway. Regardless, responsive to the threshold period of time expiring, or responsive to the user traversing the ramp 215, stairs or walkway, the controller 134 can process the second augmented reality request 190 to adjust the height of the hand rail 210 for the second user.

In another arrangement, the augmented reality devices 110, 170 of a plurality of users may coordinate with each other to determine which augmented reality device 110 will initially have control over the physical apparatus 130 to adjust the height of the hand rail 210. For example, the augmented reality applications 116, 176 of the respective augmented reality devices 110, 170 can be configured to establish a communication link 192 with one another using the respective processors 114, 174 and transceivers 112, 172 (e.g., using BLE). Via the communication link 192, the respective augmented reality applications 116, 176 can implement the coordination, for example by exchanging coordination messages 194 with one another. Based on the coordination, the augmented reality applications 116, 176 can determine which augmented reality device 110, 170 has priority over the other for control of the physical apparatus 130, and which augmented reality device 110, 170 will, at least initially, yield control of the physical apparatus 130 to the other augmented reality device 110, 170. Such determination can be based on levels of disability, ages, heights, etc. of the users of the respective augmented reality device 110, 170, or based on any other suitable parameters.

By way of example, each user profile 118, 178 and/or electronic health record 120, 180 can indicate a severity (e.g., a value indicating the severity) of a respective user's disability. The augmented reality applications 116, 176 can determine to allow the augmented reality device 110 of the user with the highest, or the lowest, severity of disability to have priority over the augmented reality device 170 for control of the physical apparatus 130. Accordingly, the augmented reality device 110 can initiate the controller 134 to adjust the height of the hand rail 210, for example, by communicating a respective augmented reality request 160 to the physical apparatus 130. Responsive to receiving the augmented reality request 160, the controller 134 can change the configuration of the physical apparatus 130 in accordance with the augmented reality request 160. Responsive to the threshold period of time expiring, or responsive to the user traversing the ramp 215, stairs or walkway, the other augmented reality device 170 can communicate another augmented reality request 190 to the physical apparatus 130. Responsive to receiving the other augmented reality request 190, the controller 134 can change the configuration of the physical apparatus 130 in accordance with the augmented reality request 190, for example by adjusting a height of the hand rail for the user of the augmented reality device 170.

The augmented reality application 176 can communicate with the augmented reality application 116 and/or the physical apparatus application 140 to determine when to communicate the augmented reality request 190. By way of example, the physical apparatus application augmented reality application 116 and/or the physical apparatus application 140 can communicate to the augmented reality application 176 a message (not shown) indicating that the user the user of the augmented reality device 110 has traversed the ramp 215, stairs or walkway.

In yet another arrangement, the augmented reality applications 116, 176 each can present information to their respective users indicating that a plurality of users are attempting to access the hand rail 210, and prompting the users to indicate whether they agree to delay the adjustment for them until one or more other users have used the hand rail 210. Still, any other process to coordinate the height adjustment for a plurality of users can be implemented, and the present arrangements are not limited in this regard.

Figure 3:
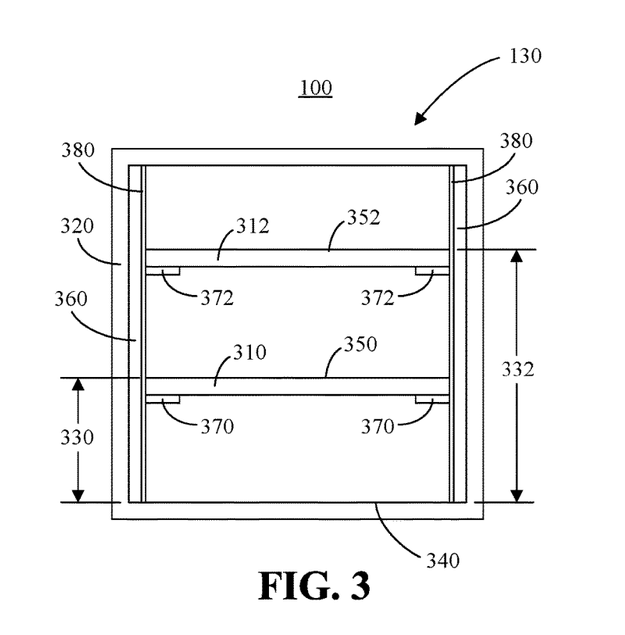
FIG. 3 depicts an example of moveable shelves in an augmented reality environment.

FIG. 3 depicts an example of movable shelves 310, 312 in an augmented reality environment 100. In this example, the physical apparatus 130 can include at least one shelf 310, 312 as the controlled structure 136 (FIG. 1). The present arrangements are not limited to the number of movable shelves 310, 312. For example, the present arrangements can include one movable shelf, two moveable shelfs, three movable shelfs, four movable shelfs, five moveable shelfs, and so on.

The shelves 310, 312 can be movably disposed in a cabinet 320, though the present arrangements are not limited in this regard. For instance, the shelves 310, 312 can be movably attached to a wall or another structure. As will be described, a height 330, 332 of each shelf 310, 312 can be adjustable. Moreover, the height(s) 330, 332 can be adjusted to heights that are preferred by the user of the augmented reality device 110 (FIG. 1). This can facilitate accessibility of the shelves 310, 312 to the user, making it easier for the user to access items from the shelves 310, 312 and place items on the shelves 310, 312.

Referring to FIGS. 1 and 3, the augmented reality device 110 can determine whether the user is within a threshold distance of the shelves 310, 312, for example based on a beacon signal or user input as previously described with respect to FIGS. 1 and 2. Responsive to detecting the beacon signal or the user input, using the transceiver 112 and processor 114 (shown in FIG. 1), the augmented reality application 116 can communicate the augmented reality request 160 to the physical apparatus 130. The augmented reality request 160 can indicate a preferred height 330 of the shelf 310 and/or a preferred height 332 of the shelf 312. The augmented reality application 116 can determine the preferred heights 330, 332 based on the user profile 118 or the electronic health record 120, and generate the augmented reality request 160 to include the preferred height 330 and/or preferred height 332.

The augmented reality application 116 can communicate the augmented reality request 160 to the physical apparatus 130, for example as previously described with respect to FIGS. 1 and 2. The controller 134 can process the augmented reality request 160 to determine the preferred height(s) 330, 332 of the shelf/shelves 310, 312 for the user. In this regard, the augmented reality request 160 can initiate adjustment of the height(s) 330, 332 of the shelf/shelves 310, 312 for the user. The height(s) 330, 332 can be measured/defined from a bottom 340 of the cabinet 320 to tops 350, 352 of the respective shelves 310, 312, measured/defined from floor to a tops 350, 352 of the respective shelves 310, 312, or measured/defined from in any other suitable manner.

The controller 134 can output control signals (not shown) to one or more actuators 360. The control signals 230 can control the actuators 360 to move the shelves 310, 312, for example vertically up and down, to the desired heights 330, 332. In one arrangement, the actuators 360 can be slide actuators that move structural support members 370, 372, to which the shelves 310, 312 are respectively attached, up and down in the vertical direction. Still, other types of actuators can be used and the present arrangements are not limited in this regard.

In one arrangement, the actuators 360 can include sensors 380 that generate sensor data indicating the present heights of the shelves 310, 312. In another arrangement, the sensors 380 can be located external to the actuators 360 in suitable locations. In one aspect, the actuators 360 can process the sensor data to determine the height(s) of the shelves 310, 312 at any time, for example prior to, when, and after the shelves 310, 312 are moved, and stop movement of the shelves 310, 312 responsive to the shelves 310, 312 being moved from previous heights to the desired heights 330, 332. In another aspect, the sensors can communicate the sensor data to the controller 134, and the controller 134 can generate the control signals 230 in response to the sensor data. In this regard, the controller 134 can control the actuators 360 to stop movement of the shelves 310, 312 responsive to the respective shelves 310, 312 being moved to the desired heights 330, 332.

At this point, it should be noted that the present arrangements are not limited to the examples of FIGS. 2 and 3. For example, the arrangements described herein can be applied to adjust a height of a wheel chair in order to facilitate ingress into, and egress from, the wheel chair, and adjust the height of the wheel chair for travel. In another example, the arrangements described herein can be applied to adjust a height of a vehicle to facilitate ingress into, and egress from, the vehicle. For example, the controller 134 can control an air suspension system of the vehicle to lower the vehicle to aid ingress/egress, and raise the vehicle for travel.

Figure 4:
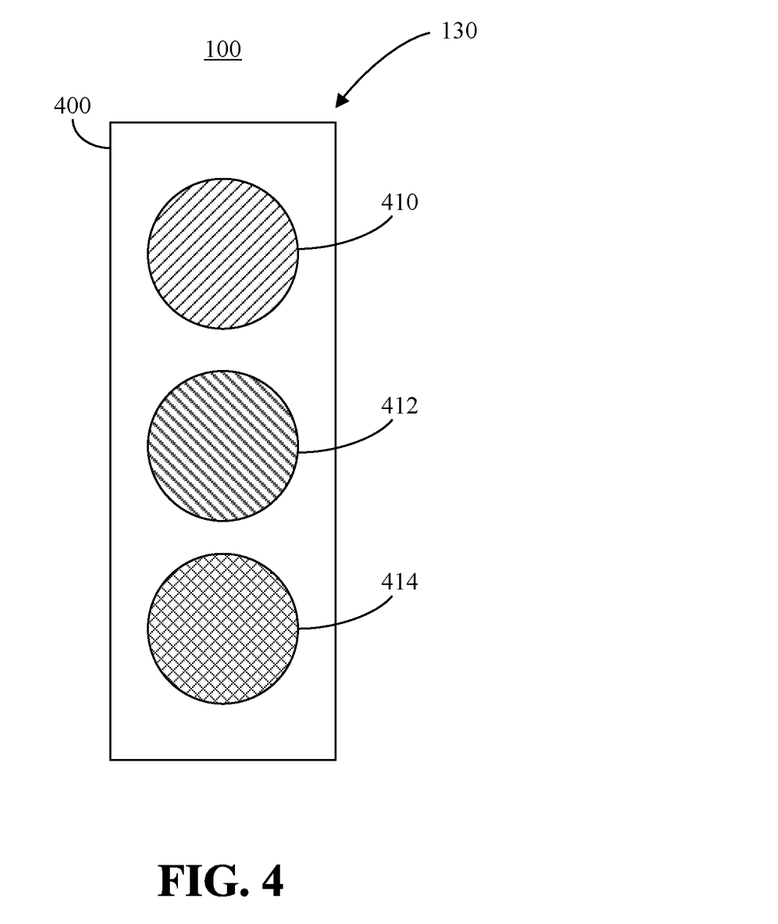
FIG. 4 depicts an example of a sign in an augmented reality environment.

FIG. 4 depicts an example of a sign 400 in an augmented reality environment 100. In this example, the physical apparatus 130 can include the sign 400 as the controlled structure 136 (FIG. 1). The sign 400 can be operable to change at least one color of at least one portion 410, 412, 414 of the sign 400. In one arrangement, for example an arrangement in which the sign 400 is a traffic signal, as depicted in FIG. 4, each portion 410, 412, 414 of the sign 400 can present one or more particular colors, though each color need not be presented simultaneously. In another arrangement, the sign 400 can present text in one or more colors. In yet another arrangement, the sign 400 can present one or more images in one or more colors.

A user may have a visual impairment (e.g., color blindness) in which the user is unable to distinguish certain colors, which can be indicated in the user profile 118 and/or the electronic health record 120. Thus, the user may not have the ability to distinguish different colors presented by the sign 400. The present arrangements, however, can facilitate the user's recognition of the various portions 410, 412, 414 of the sign 400. In illustration, the user may have red-green color blindness in which the user is not able to distinguish the color red from the color green. The present arrangements can present one or more of the various portions 410, 412, 414 of the sign 400 in colors easily recognizable by the user. Accordingly, the user will not confuse the portions 410, 412, 414 and will understand their significance (e.g., caution, stop or proceed). In the following example, it can be assumed that the user is a driver of a vehicle traveling on a roadway and encountering the sign 400.

Referring to FIGS. 1 and 4, responsive to detecting the beacon signal or the user input, using the transceiver 112 and processor 114 (shown in FIG. 1), the augmented reality application 116 can communicate the augmented reality request 160 to the physical apparatus 130, as previously described. In another arrangement, the augmented reality application 116 can determine the user (e.g., the augmented reality device 110 used by the user) is within a threshold distance of the sign 400 using GPS data generated by a GPA receiver (not shown) of the augmented reality device 110. Responsive to determining that the user is within the threshold distance of the sign 400, the augmented reality application 116 can communicate the augmented reality request 160 to the controller 134.

The augmented reality request 160 can indicate a preferred color for one or more of the portions 410, 412, 414 of the sign 400. For example, assume the user has red-green color blindness. Since the portion 410 of the sign 400 typically presents a red color of light and the portion 414 of the sign 400 typically presents a green color of light, the user may have trouble distinguishing between the respective colors presented by the portions 410, 414 of the sign 400.

Nonetheless, the present arrangements address this issue. If the portion 410 of the sign 400 normally is presented in the color red, the augmented reality request 160 can indicate another preferred color of light to be illuminated by the portion 410, for example brown. Similarly, if the portion 414 of the sign 400 normally is presented in the color green, the augmented reality request 160 can indicate another preferred color of light to be illuminated by the portion 414, for example blue. The augmented reality application 116 can determine the preferred colors based on processing the user profile 118 and/or the electronic health record 120.

The controller 134 can be configured to, responsive to receiving the augmented reality request 160, present the portions 410, 414 of the sign 400, when illuminated, in the respective preferred colors. For example, the controller can communicate control signals to switches/controllers controlling the lamps 510. The switches/controllers can configure the portions 410, 414 of the sign 400 to present desired colors when illuminated.

Other drivers also may be encountering the sign 400, and the preferred colors may be confusing to them. Nonetheless, the controller 134 can be configured to, responsive to receiving the augmented reality request 160, simultaneously present different colors or iteratively present different colors in a sequential manner. For example, the controller 134 can be configured to, for a portion 410 of the sign 400, simultaneously illuminate both red colored lamps and brown colored lamps. Similarly, the controller 134 can be configured to, for a portion 414 of the sign 400, simultaneously illuminate both green colored lamps and blue colored lamps. In another example, the lamps can be configured to present, at any particular time, a particular color. The lamps can be, for example, LED lamps configured to illuminate two or more colors. The controller 134 can be configured to, for the portion 410 of the sign 400, control the lamps to alternate between presenting red colored light and brown colored light. Further, the controller 134 can be configured to, for the portion 414 of the sign 400, control the lamps to alternate between presenting green colored light and blue colored light.

In another arrangement, for example an arrangement in which the augmented reality device 110 is implemented as smart glasses or an augmented reality headset, the augmented reality application 116, via the processor 114, can overlay preferred colors onto a real world view of the sign 400 presented by the augmented reality device 110. In this regard, the augmented reality device 110 can augment the real world presentation of the sign 400.

For example, the augmented reality device 110 can include an image capture device that captures images of the sign 400 and presents the images to the user via lenses of the smart glasses or a display of the augmented reality headset. The augmented reality application 116 can recognize, in real time, colors of light presented by the portions 410, 412, 414 of the sign 400. Further, the augmented reality application 116 can, based on the user profile 118 and/or electronic health record 120, determine the colors of light that are not distinguishable by the user. The augmented reality application 116 can select, in real time, based on the user profile 118 and/or electronic health record 120, colors to overlay on the respective portions 410, 412, 414 of the sign 400 to facilitate the user's understanding of the sign. The augmented reality application 116 can present for visualization to the user, using an image presentation device (e.g., that projects images/colors onto lenses of smart glasses or presents images/colors on a display of the augmented reality headset), the selected colors for the respective portions 410, 412, 414 of the sign 400. For example if the portion 410 of the sign 400 is illuminated in a red color, the augmented reality application 116 can present a color brown over the portion 410 of the sign 400 when that portion of the sign is illuminated, and present a color blue over the portion 414 of the sign when that portion of the sign is illuminated.

Figure 5:
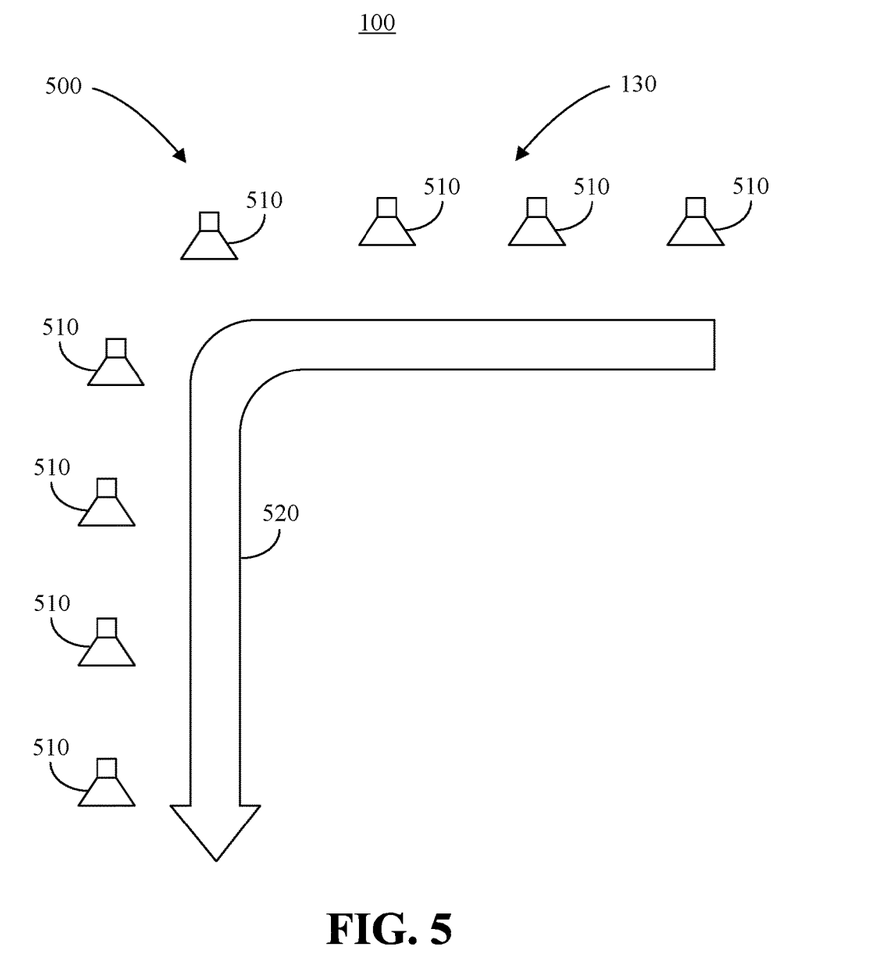
FIG. 5 depicts an example of a lighting system in an augmented reality environment.

FIG. 5 depicts an example of a lighting system 500 in an augmented reality environment 100. In this example, the physical apparatus 130 can include lamps 510 of the lighting system 500 as the controlled devices 136 (FIG. 1). The lighting system 500 can illuminate a path 520 for the user to travel (e.g., travel safely) from a first location (e.g., a current location of the user) to at least a second location (e.g., a location to which the user desires to travel).

Referring to FIGS. 1 and 5, the controller 134 can control the lamps 510 to illuminate the path 520 in response to receiving the augmented reality request 160 from the augmented reality device 110. Further, the augmented reality requests 160 can indicate to the controller 134 to illuminate the path 520 in one or more particular colors. Such colors can be colors that are distinguishable to the user from other colors. In illustration, the user may have a visual impairment in which the user is unable to distinguish certain colors. The augmented reality requests 160 can indicate a preferred color in which to illuminate the path 520 so that the user is able to distinguish such illumination from other light the user may visually receive.

In one arrangement, the augmented reality requests 160 can be generated in response to one or more user inputs in the augmented reality device 110. For example, the user can select a menu item presented by a user interface of the augmented reality device 110. The menu item can be, for instance, a menu item indicating a request to find a nearest exit, a menu item indicating a request to proceed to a particular location, etc. In response to the user selection of the menu item, the augmented reality application, using the processor 114, can generate the augmented reality requests 160. Using the processor 114 and the transceiver 112, the augmented reality application can communicate the augmented reality request 160 to the transceiver 132, which can communicate the augmented reality requests 160 to the controller 134.

The controller 134 can process the augmented reality requests 160 and, in response, select the lamps 510 that are appropriate to illuminate the path 520, and communicate control signals to those lamps (e.g., to switches/controllers controlling the lamps 510) in order to illuminate the lamps 510. The lamps 510 can be configured to generate a plurality of colors of light. For example, each lamp 510 can include one or more LED lamps configured to illuminate two or more colors.

Based on the augmented reality request 160, the control signals can indicate the color of light each respective lamp 510 is to generate. For example, the augmented reality request 160 can indicate one or more particular colors of light, and the controller 134 can generate the control signals to indicate the one or more particular colors of light. The augmented reality application 116 can select the particular color(s) of light based on the user profile 118 and/or the electronic health record 120 of the user. For example, if the user has difficulty distinguishing certain colors of light, the augmented reality application 116 can select one or more colors that are distinguishable to the user.

In another arrangement, for example an arrangement in which the augmented reality device 110 is implemented as smart glasses or an augmented reality headset, the augmented reality application 116, via the processor 114, can overlay the path 520 onto a presentation of the real world environment presented to the user via the augmented reality device 110. In this regard, the augmented reality device 110 can augment the real world presentation with the path 520, for example in a manner similar to that described with respect to FIG. 4.

Figure 6:
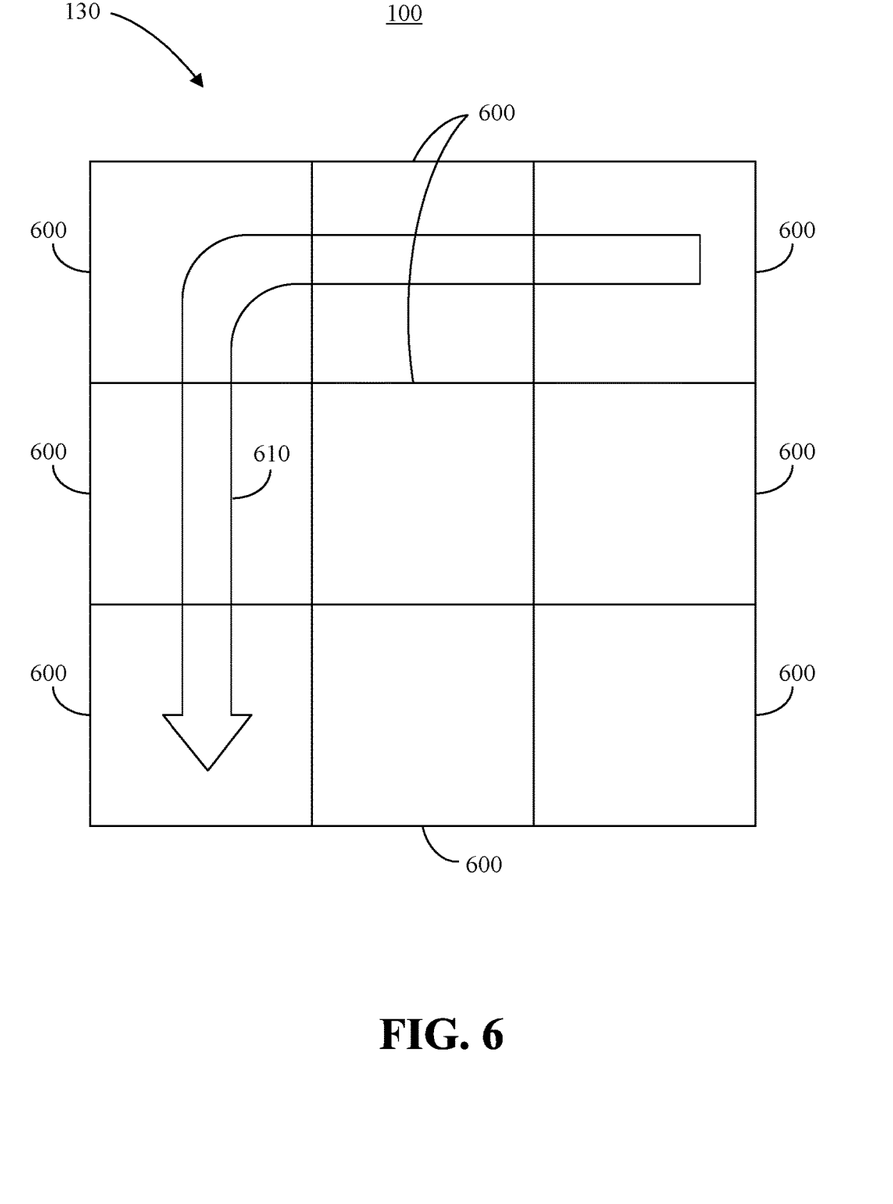
FIG. 6 depicts an example of an illuminating configurable physical structure in an augmented reality environment.

FIG. 6 depicts an example of an illuminating configurable physical structure 130 in an augmented reality environment 100. In this example, the physical structure 130 can be a wall, a floor, a ceiling, a panel, etc. The physical structure 130 can include at least one display 600 configured to emit light. In one arrangement, the physical structure 130 can include a plurality of displays 600. Examples of a display 600 include, but are not limited to, a light emitting diode (LED) display, an organic LED (OLED) display, a liquid crystal display (LCD), a plasma display, and so on. In another example, a display 600 can be a fiber optic display that includes a plurality of fiber optic light tubes (not shown). A first end of each fiber optic light tube can be flush with a surface of the display 600, recessed behind the surface of the display 600, or protrude from the surface of the display 600. A second end of each tube can be attached to, or placed proximate to, a lamp (e.g., an LED). Each fiber optic tube can emit light generated by the respective lamp through the first end of the fiber optic tube. In another example, a display 600 can include an image projector that projects images onto the physical structure 130.

Referring to FIGS. 1 and 6, the controller 134 can control the display(s) 600 to illuminate a path 610 for the user to travel (e.g., travel safely) from a first location (e.g., a current location of the user) to at least a second location. The controller 134 can control the display(s) 600 to illuminate the path 610 in response to receiving the augmented reality request 160 from the augmented reality device 110. Further, the augmented reality requests 160 can indicate to the controller 134 to illuminate the path 610 in one or more particular colors.

In another arrangement, the controller 134 can selectively control the display(s) 600 to change an illuminated color scheme visually depicting colors or textures of the physical apparatus 130 in response to receiving the augmented reality request 160 from the augmented reality device 110. For example, the controller 134 can control the display(s) 600 to change a visual appearance of the display(s) 600, and thus the physical structure 130, by changing colors or textures depicted on the display(s) 600.

In illustration, if the physical apparatus 130 is a ceiling, the controller 134 can control the display(s) 600 to change one or more images presented by the display. For instance, a first set of images can be images of ceiling tiles. The images of ceiling tiles can present certain textures. Such textures can change in response to the images being changed. Accordingly, the physical apparatus 130 can look like a certain type of ceiling. In response to receiving the augmented reality request 160 from the augmented reality device 110, the controller 134 can control the displays 600 to change the images, for example to images depicting different ceiling tiles. Accordingly, the physical apparatus 130 can look like a different type of ceiling. If the physical apparatus 130 is a floor, a first set of images presented by the displays 600 can be images depicting wood flooring. Accordingly, the physical apparatus 130 can look like a wood floor, including wood textures. In response to receiving the augmented reality request 160 from the augmented reality device 110, the controller 134 can control the displays 600 to change the images, for example to images depicting marble flooring. Accordingly, the physical apparatus 130 can look like a marble floor. If the physical apparatus 130 is a wall, a first set of images presented by the displays 600 can be images depicting one or more works of art. In response to receiving the augmented reality request 160 from the augmented reality device 110, the controller 134 can control the displays 600 to change the images, for example to images depicting one or more other works of art. In other arrangements, the controller 134 can control the displays 600 to present various colors, combinations of colors and/or visible textures. For example, the displays 600 can present images of steel grating, images of carpet, and so on.

Figure 7:
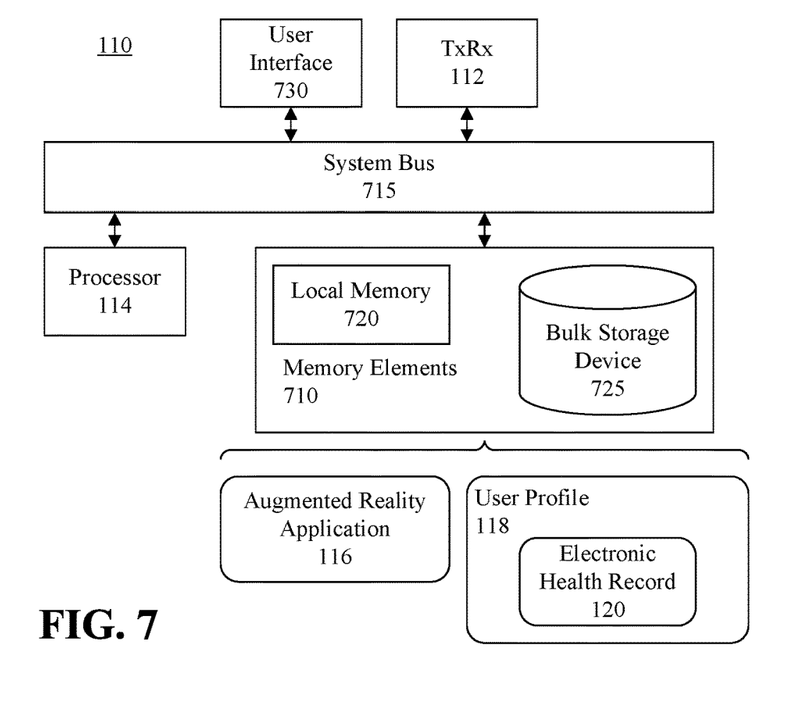
FIG. 7 is a block diagram illustrating example computing architecture for an augmented reality device.

FIG. 7 is a block diagram illustrating example computing architecture for an augmented reality device 110. The augmented reality device 170 can be configured in a similar manner. The augmented reality device 110 can include at least one processor 114 (e.g., a central processing unit) coupled to memory elements 710 through a system bus 715 or other suitable circuitry. As such, the augmented reality device 110 can store program code within the memory elements 710. The processor 114 can execute the program code accessed from the memory elements 710 via the system bus 715.

The memory elements 710 can include one or more physical memory devices such as, for example, local memory 720 and one or more bulk storage devices 725. Local memory 720 refers to random access memory (RAM) or other non-persistent memory device(s) generally used during actual execution of the program code. The bulk storage device(s) 725 can be implemented as a hard disk drive (HDD), solid state drive (SSD), or other persistent data storage device. The augmented reality device 110 also can include one or more cache memories (not shown) that provide temporary storage of at least some program code in order to reduce the number of times program code must be retrieved from the bulk storage device 725 during execution.

Input/output (I/O) devices such as a user interface 730 and a transceiver 112. The I/O devices can be coupled to the augmented reality device 110 either directly or through intervening I/O controllers. The user interface 730 can include one or more displays, one or more projection devices, one or more input/output audio devices, and so on.

As pictured in FIG. 7, the memory elements 710 can store the components of the augmented reality device 110, namely the augmented reality application 116, the user profile 118 and, optionally, the electronic health record 120. Being implemented in the form of executable program code, the augmented reality application 116 can be executed by the processor 114 and, as such, can be considered part of the augmented reality device 110. Moreover, the augmented reality application 116, user profile 118 and electronic health record 120 are functional data structures that impart functionality when employed as part of the augmented reality device 110.

Figure 8:
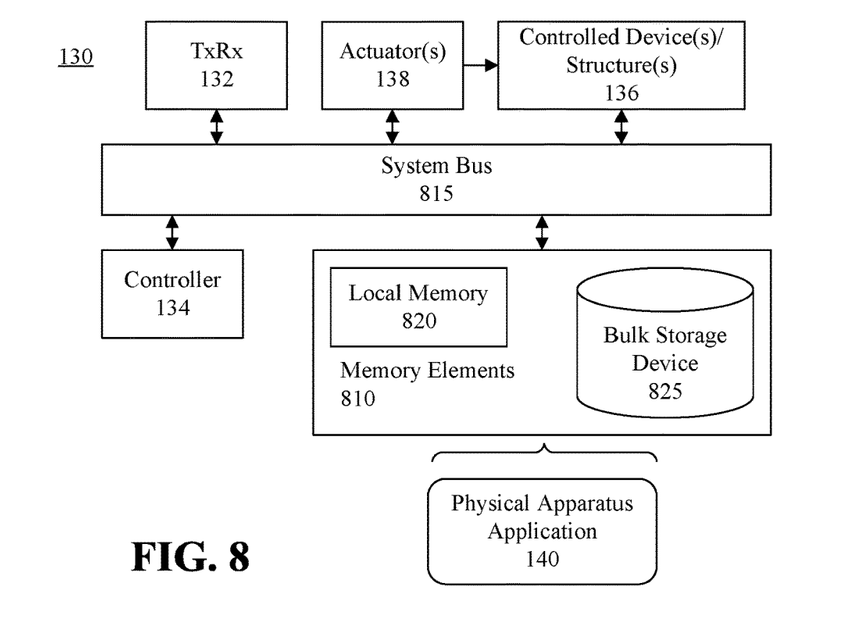
FIG. 8 is a block diagram illustrating example computing architecture for a physical apparatus.

FIG. 8 is a block diagram illustrating example computing architecture for a physical apparatus 130. The physical apparatus 130 can include at least one controller 134 coupled to memory elements 810 through a system bus 815 or other suitable circuitry. As such, the physical apparatus 130 can store program code within the memory elements 810. The controller 134 can execute the program code accessed from the memory elements 810 via the system bus 815.

The memory elements 810 can include one or more physical memory devices such as, for example, local memory 820 and one or more bulk storage devices 825. The physical apparatus 130 also can include one or more cache memories (not shown) that provide temporary storage of at least some program code in order to reduce the number of times program code must be retrieved from the bulk storage device 825 during execution.

Input/output (I/O) devices such as a transceiver 132 can be coupled to the physical apparatus 130 either directly or through intervening I/O controllers. One or more actuators 138 also can be coupled to the physical apparatus 130 either directly or through intervening I/O controllers. In one arrangement, the actuator(s) 138 can be coupled to one or more controlled devices and/or structures 136. In another arrangement, for example an arrangement in which the controlled devices and/or structures 136 are lamps, the physical apparatus 130 can include switches/controllers in addition to, or in lieu of, the actuator(s) 138.

As pictured in FIG. 8, the memory elements 810 can store the components of the physical apparatus 130, namely the physical apparatus application 140. In an arrangement in which the physical apparatus application 140 is implemented in the form of executable program code, the physical apparatus application 140 can be executed by the controller 134 and, as such, can be considered part of the physical apparatus 130. In an arrangement in which the controller 134 comprises programmable log circuitry, an FPGA, a PLA, etc., the physical apparatus application 140 can be implemented within such controller 134. The physical apparatus application 140 is a functional data structure that imparts functionality when employed as part of the physical apparatus 130.

Figure 9:
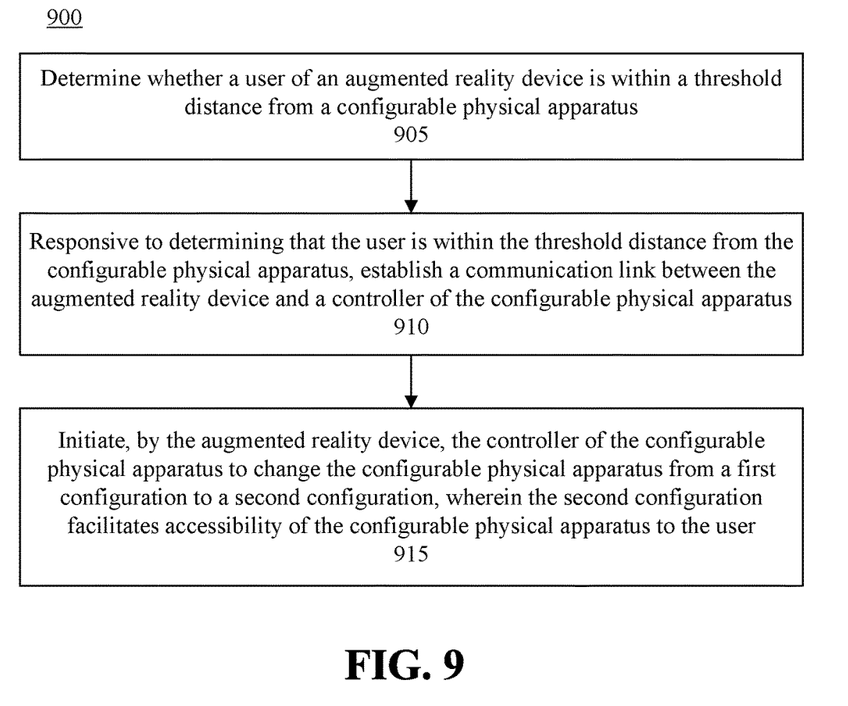
FIG. 9 is a flow chart illustrating an example of a method of initiating a physical structure to change a configuration.

FIG. 9 is a flow chart illustrating an example of a method 900 of initiating a physical structure to change a configuration. The method 900 can be implemented by the augmented reality device 110 of FIG. 1.

At step 905, the augmented reality device 110 can determine whether a user of the augmented reality device is within a threshold distance from a configurable physical apparatus. At step 910, the augmented reality device 110 can, responsive to determining that the user is within the threshold distance from the configurable physical apparatus, establish a communication link between the augmented reality device and a controller of the configurable physical apparatus. At step 915, the augmented reality device 110 can initiate the controller of the configurable physical apparatus to change the configurable physical apparatus from a first configuration to a second configuration, wherein the second configuration facilitates accessibility of the configurable physical apparatus to the user.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two, or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining whether a user of a first augmented reality device is within a threshold distance from a configurable physical apparatus;
    responsive to determining that the user is within the threshold distance from the configurable physical apparatus, establishing a communication link between the first augmented reality device and a controller of the configurable physical apparatus, wherein a second augmented reality device is within the threshold distance from the configurable physical apparatus;
    coordinating, by the first augmented reality device, with the second augmented reality device by exchanging at least one message between the first augmented reality device and the second augmented reality device;
    based on the at least one message, at least the first augmented reality device determining that the first augmented reality device has priority over the second augmented reality device for control of the configurable physical apparatus; and
    responsive to determining that the first augmented reality device has priority for control of the configurable physical apparatus, initiating, by the first augmented reality device, the controller of the configurable physical apparatus to change the configurable physical apparatus from a first configuration to a second configuration, wherein the second configuration facilitates accessibility of the configurable physical apparatus to the user.

2. The method of claim 1, wherein:
    the configurable physical apparatus comprises a hand rail; and
    changing the configurable physical apparatus from the first configuration to the second configuration comprises moving the hand rail from a first height to a second height.

3. The method of claim 1, wherein:
    the configurable physical apparatus comprises a shelf; and
    changing the configurable physical apparatus from the first configuration to the second configuration comprises moving the shelf from a first height to a second height.

4. The method of claim 1, wherein:
    the configurable physical apparatus comprises a sign; and
    changing the configurable physical apparatus from the first configuration to the second configuration comprises changing a color of at least one portion of the sign from a first color to a second color.

5. The method of claim 1, wherein:
    the configurable physical apparatus comprises a lamp; and
    changing the configurable physical apparatus from the first configuration to the second configuration comprises changing a color of the lamp from a first color to a second color.

6. The method of claim 1, wherein:
    the configurable physical apparatus comprises a plurality of lamps: and
    changing the configurable physical apparatus from the first configuration to the second configuration comprises controlling the plurality of lamps to illuminate a path for the user to travel from a first location to at least a second location.

7. The method of claim 1, wherein:
    the configurable physical apparatus comprises at least one display configured to emit light: and
    changing the configurable physical apparatus from the first configuration to the second configuration comprises selectively controlling the display to change an illuminated color scheme visually depicting colors or textures of the configurable physical apparatus.

8. The method of claim 1, further comprising:
    accessing an electronic health record of the user; and
    automatically determining the second configuration based on the electronic health record of the user.

9. The method of claim 1, further comprising:
    accessing user profile of the user; and
    automatically determining the second configuration based on the user profile of the user.

* * * * *